United States Patent [19]

Lissau

[11] 4,285,361

[45] Aug. 25, 1981

[54] SLOW CLOSING FAUCET

[75] Inventor: Frederic Lissau, Chicago, Ill.

[73] Assignee: Sloan Valve Company, Franklin Park, Ill.

[21] Appl. No.: 930,605

[22] Filed: Aug. 3, 1978

[51] Int. Cl.³ .............................................. F16K 25/00
[52] U.S. Cl. .............................. 137/454.6; 137/636.4; 137/607; 251/21; 251/44; 220/315
[58] Field of Search ............... 137/454.2, 454.6, 636.4, 137/607; 251/15, 21, 44, 77, 37; 220/315

[56] References Cited

U.S. PATENT DOCUMENTS

| 1,624,130 | 4/1927 | Beggs | 251/21 |
| 1,971,186 | 8/1934 | Kornas | 251/360 X |
| 2,202,971 | 6/1940 | Vedoe | 137/636.4 X |
| 3,279,742 | 10/1966 | Billeter | 251/44 X |
| 3,608,587 | 9/1971 | Zbell | 251/77 X |
| 3,646,958 | 3/1972 | Braas | 251/77 X |
| 3,791,618 | 2/1974 | Nelson | 251/37 |
| 3,998,241 | 12/1976 | Jones | 137/454.6 |

FOREIGN PATENT DOCUMENTS

| 561008 | 10/1932 | Fed. Rep. of Germany | 251/15 |
| 1471912 | 4/1977 | United Kingdom | 251/15 |

Primary Examiner—Harold W. Weakley
Attorney, Agent, or Firm—Kinzer, Plyer, Dorn & McEachran

[57] ABSTRACT

A removable slow closing faucet control cartridge for mounting to a faucet casing. The faucet is activated by a push button and automatically closes after permitting water flow for a short period of time regardless of a continued depression of the push button.

15 Claims, 17 Drawing Figures

SLOW CLOSING FAUCET

SUMMARY OF THE INVENTION

This invention relates to an actuating mechanism for a faucet or like valve. More particularly, it is concerned with a removable control cartridge for a quick opening self-closing type faucet for use on a lavatory sink, and the principal object of the invention is to design a new and improved faucet of the foregoing type.

Another purpose of the invention is to provide a slow-closing faucet with a non-hold-open feature to prevent excessive water waste.

Another purpose of the invention is to provide a slow-closing faucet which may also be used as a hot and cold water mixing faucet.

Another purpose is a slow-closing faucet cartridge incorporating a flow control to provide a relatively constant flow over a wide range of water supply line pressures.

Another purpose of the invention is to provide a slow-closing faucet having a constant time cycle and constant volume of water delivered to the outlet each cycle.

Other objects and advantages of the invention become more apparent in the following specifications, drawings and claims.

DESCRIPTION OF THE PREFERRED EMBODIMENT

The control cartridge of this invention is designated by the numeral 10 and is removably mounted within a faucet casing 12. Following conventional practices, the faucet casing 12 is mounted to the rear of the lavatory deck (not shown) with the faucet spout 11 overhanging the sink.

Figures 1, 2, 2A:
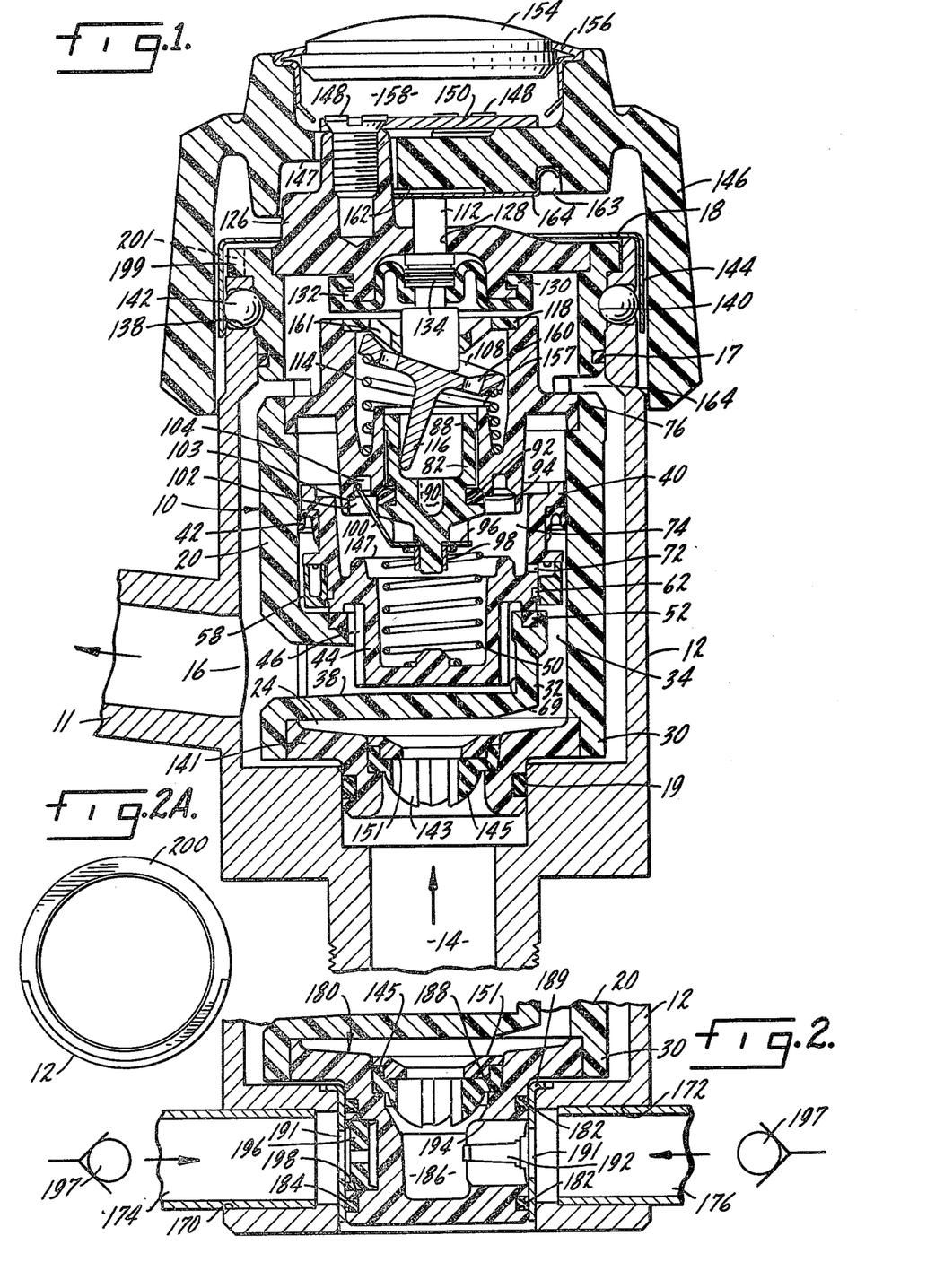
FIG. 1 is a cross section of the closed cold water faucet.
FIG. 2 is a partial view in cross section of the mixing faucet.
FIG. 2A is a detail view of the housing stops for the embodiment shown in FIG. 2.

As shown in FIG. 1, casing 12 is generally cylindrical in shape having a threaded inlet 14 for connection to a water supply line and an outlet 16 located in its side wall and opeing to spout 11. Mounted through the circular top opening 18 of casing 12 is the removable control cartridge 10 for controlling the passage of water between the casing inlet 14 and outlet 16. Between cartridge 10 and casing 12 are seals 17 and 19 to prevent leakage.

Figures 4, 8:
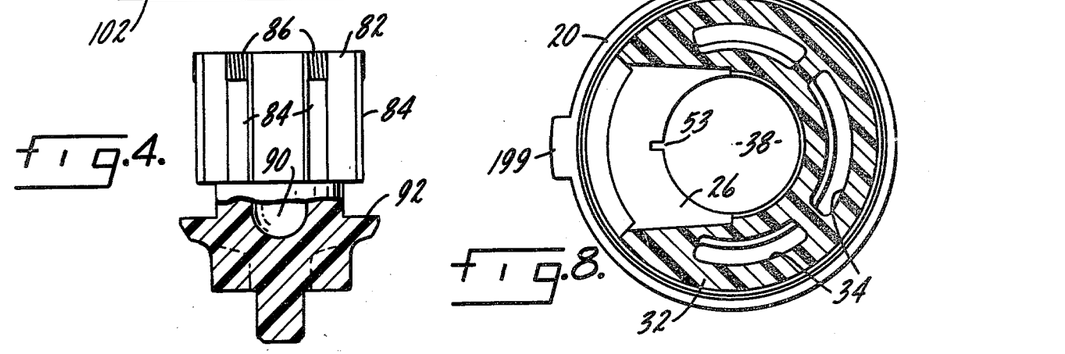
FIG. 4 is an enlarged side view in partial cross section of the poppet valve.
FIG. 8 is a sectional view of the cartridge body taken on line 8—8 of FIG. 7.
Figure 7:
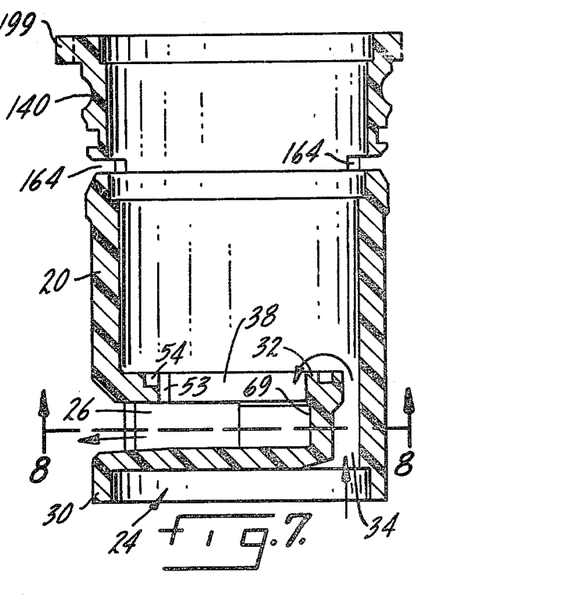
FIG. 7 is a cross-sectional view of the cartridge body on a reduced scale.

The plastic cartridge body 20, generally cylindrical in shape, can be best seen in FIG. 7. Body 20 has an inlet 24 and outlet 26 aligning with casing inlet 14 and outlet 16, respectively. At the bottom of body 20 is an annular rim portion 30. Adjacent to rim portion 30 and integral with body 20 is a generally disc-shaped portion 32. As can be seen in FIG. 8, a plurality of slots 34 along the periphery of the disc portion 32 provide a flow passage from cartridge inlet 24 through disc 32. Axially centered within disc 32 is well 38. The bottom side wall of well 38 has an opening forming the cartridge outlet 26.

Figure 9:
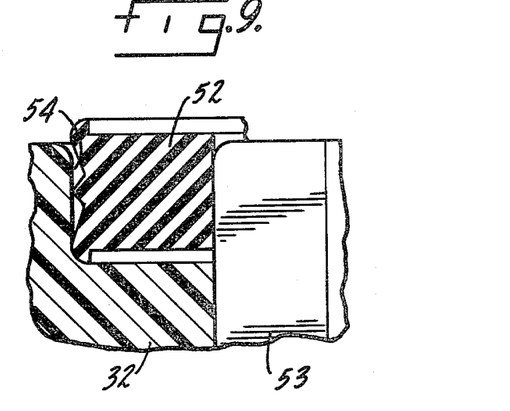
FIG. 9 is a partial cross section of the main valve seat and venting slot on an enlarged scale.

Piston 40, as shown in FIG. 1, is slidably mounted within cartridge body 20 and sealed thereon by a rubber cup-shaped seal 42. Piston 40 has a cylindrical portion 44 smaller in diameter than, and extending into, well 38. This difference in diameters, along with axially extending slots 46 appearing on the outer surface of piston 40, provide a flow passage through well 38 to outlet 26. A spring 50 normally biases piston 40 to seat on the main valve seat 52 positioned within an annular groove 54 in disc 32. As seen in FIG. 9, a venting slot 53 axially extends along disc portion 32 and provides venting means to prevent pressure buildup from popping seat 52 upwards upon the rising of piston 40.

Figure 3:
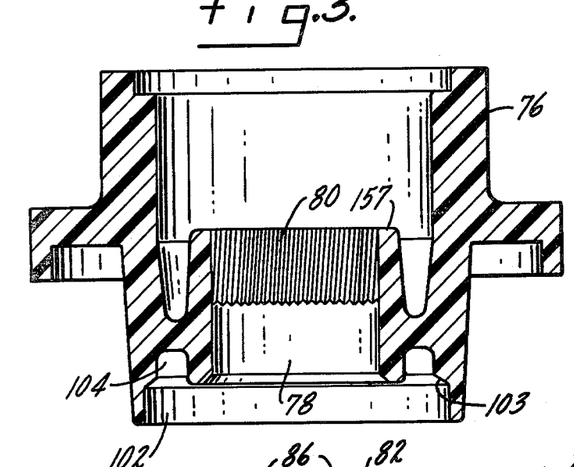
FIG. 3 is a cross section of the poppet valve support on an enlarged scale.

Attached and sealed to the upper interior of cartridge body 20 is poppet support 76 of a shape most clearly seen in FIG. 3. A hollow opening 78 is centrally located in support 76 and an annular portion thereon is provided with slightly angled serrations 80. Slidably mounted within opening 78 is relief valve or poppet 82 having a plurality of vertical ribs 84 spaced around its outer periphery as shown in FIG. 4. A slightly angular serrated portion 86 for cooperation with support serrations 80 appears on the upper end of each rib 84. The upper end of poppet 82 has bore 88 and a coaxial second deeper and narrower bore 90. On the periphery of poppet 82 is groove 92 and fitted therein is poppet seal 94.

Spring 50 normally upwardly biases poppet 82 to seat against poppet support 76. A multipronged latch spring 96 is secured at the bottom of poppet 82 by retaining ring 98, while its prongs 100 latch against angular shelf 103 connecting the concentric grooves 102, 104 in the bottom of poppet support 76.

Located within poppet support 76 is actuator 108 for unseating poppet 82. Actuator 108 has a post portion 116 extending into bore 88 and is normally biased by spring 114 to a tilted position against an angled bottom portion of stem 112. Preventing misalignment of stem 112 is stem guide 118 attached to poppet support 76. Attached to the top of the cartridge body 20 is cover 126. The top portion of operating stem 112 extends through opening 128 in cover 126. Rolling diaphragm seal 130, for sealing opening 128, is fitted around annular support member 132 protruding from bottom of cover 126. Appearing upon the intermediate portion of stem 112 are a plurality, typically three, of annular grooves 134 which allow diaphragm 130 to seal more effectively around stem 112 as the water pressure acts against diaphragm 130.

Appearing adjacent to the top of housing 12 are a plurality, typically six, of tapered holes 138 and adjacent to them is annular groove 140 in the outer surface of cartridge body 20. Within each hole 138 is a steel ball 142 which protrudes from the casing 12 into the cartridge 20 to prevent axial movement of the cartridge. A resilient metal cup-shaped retaining member 144 is fitted over the top of cartridge 20 and casing 12 and extends over balls 142 holding them in place.

A cup-shaped push button 146 is slidably and reciprocally mounted to cover 126 by means of screws 148 and mounting plate 150. The reciprocation of push button 146 in an upward direction is restrained by plate 150, while surface 147 terminates the push button's downward stroke as it contacts cover 126. A conventional top cap 154 with retaining member 156 is removably snapped into place in recess 158 of the top push button 146.

Appearing on the bottom of push button 146 is centrally located recess 162. A spring member 164 set in cavity 163 covers recess 162. It is noted that this arrangement prevents excessively hard forces applied to push button 146 by the user from direct transfer to stem 112 and other operative parts.

FLOW CONTROL

Attached to the rim portion 30 at the inlet end of cartridge 20 is lower cover 141 and attached thereto is annular support member 151. A resilient automatic flow control regulating unit 145 is inserted between member 151 and cover 141. Flow control 145 has a pressure exposed portion 144 which may be of a semispherical shape and a supporting rim portion 147.

Figure 5:
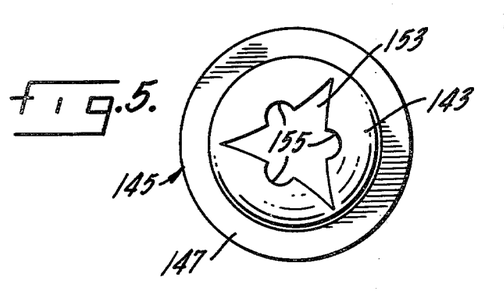
FIG. 5 is a bottom view of the flow control in the uncompressed position on an enlarged scale.

As seen in FIG. 5, extending through the semispherical portion 143 of flow control 145, is a substantially triangular aperture 153. Located at the center of each of the sides of aperture 153 is a semicircular aperture or groove 155. When the water pressure at inlet 14 is low, for instance one p.s.i., the flow passage through aperture 153, 155 will be substantially of the shape shown in FIG. 5. As the pressure is increased, flow control 145 will be correspondingly compressed causing triangle aperture 153 to first reduce in area as its sides converge toward its center. When the water pressure is approximately 20 p.s.i., flow control 145 will have been compressed to the shape approximated in FIG. 6. Under this condition, the flow passage will be defined by apertures 155 having now been converged at the center axis of the flow control.

The flow rate through the flow control is defined by the equation $Q = C_1 Ax \sqrt{\Delta P}$; where Q is the flow rate, $C_1$ is a constant, Ax is the variable orifice of the flow control, and $\Delta P$ is the pressure drop through the flow control unit. Solving for Ax, $$Ax = \frac{Q}{C_1 \sqrt{\Delta P}};$$

however, for a constant flow rate it is possible to set $Q/C_1 = C_2$, therefore the changes in the variable area will be governed by the equation $$Ax = \frac{C_2}{\sqrt{\Delta P}} \text{ or } \frac{Ax}{C_2} = \frac{1}{\sqrt{\Delta P}}.$$

Thus it can be seen that to obtain a constant flow rate, it is necessary that the change in the area (Ax) of the flow control orifice be inversely proportioned to the changes in $\sqrt{\Delta P}$.

Figure 16:
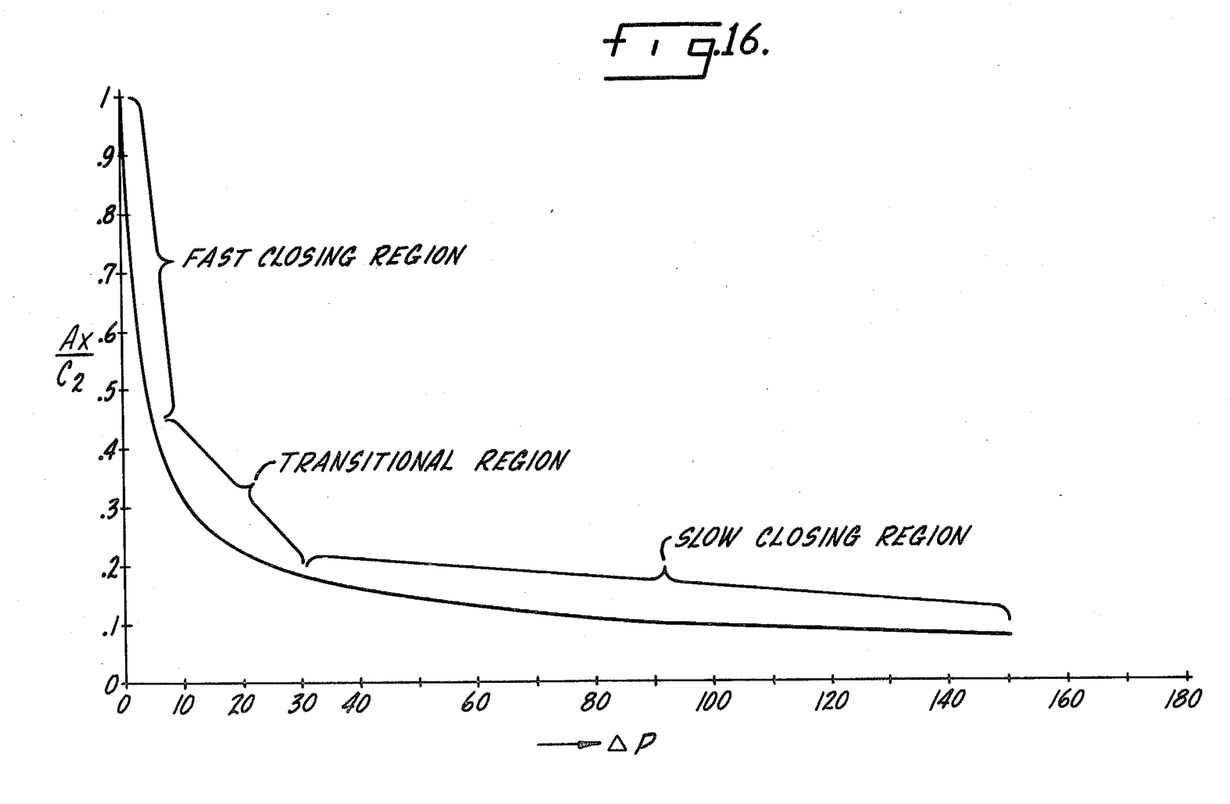
FIG. 16 is a graph showing the desired changes in the area of the flow control orifice versus changes in pressure.

In FIG. 16 a graph of $$\frac{1}{\sqrt{\Delta P}} = \frac{Ax}{C_2}$$

has been plotted to show the theoretically desired reduction in area of the orifice as the pressure increases. For purposes of clarity, the maximum area of Ax has been set at 1 square unit and $C_2$ has been set at 1.

For increases in pressure in the lower range of approximately 0 to 6 p.s.i., the valve of the orifice area (Ax) decreases at a rapid and fairly uniform rate. In a transitional range, approximately 6 to 20 p.s.i., the value of Ax decreases at a relatively moderate and variable rate. Above 20 p.s.i., the value of Ax changes at a slow and substantially uniform rate as the pressure increases.

To obtain the desired changes in the area of the flow control orifice, the flow control has been provided with a normally triangle-shaped aperture 153. The triangular shape is such that the initial compression of the flow control unit causes the cross-sectional are of the aperture 153 to be reduced at a relatively high and uniform rate. This is the result of adjacent sides at the vertex areas of the triangle quickly meeting to reduce the size of the opening, and to aid this action the sides of aperture 153 may be made concave relative to its central axis. This occurrence upon initial compress of the flow control is denoted as the "FAST CLOSING REGION" in FIG. 16.

With aperture 153 now distorted from its original substantially triangular shape, further increases in pressure cause opening 153 to decrease in area at a relatively moderate and variable rate. This action approximates the changes in area (Ax) shown in the "TRANSITIONAL REGION".

Figure 6:
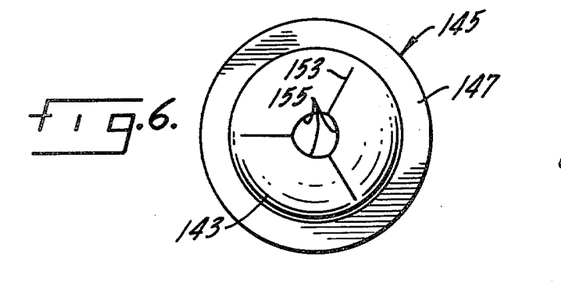
FIG. 6 is a bottom view of the flow control in one compressed position.

In the higher pressure ranges, the sides of triangular aperture 153 will have converged, thereby resulting in a substantially circular passage defined by grooves 155 as shown in FIG. 6. This circular shape is such that, upon increases in pressure, the reduction in area is at a relatively slow and uniform rate. This action is approximated in the "SLOW CLOSING REGION" of FIG. 16.

It is to be understood that the invention is not to be limited only to the combination of triangular and circular openings. Other shapes which quickly reduce in area upon compression can be substituted for the triangular shape, and shapes which slowly reduce upon compression can be substituted for the circular opening. The major importance is that a plot of the reduction of the area of the openings due to the compression by pressure substantially conforms to the curve of Ax.

After the inlet water has passed through flow control 145, it continues upward past disc portion 32 via disc slots 34 and reaches timing and filter mechanism 58.

TIMING AND FILTERING MECHANISM

An annular timing mechanism 58 is sealably attached to the outer wall of piston 40 and filters the water as well as controlling the timing of the passage of water into timing chamber 74. Referring to FIGS. 10-13, a plurality of vertical V-shaped filter grooves 60 appear around the lower inner periphery of timing mechanism 58, and act to prevent the passage of any small foreign matter which may be in the water. Axially disposed slot 64 communicates filter grooves 60 with the series orifice or a network of pockets 66 which are disposed in the top surface of timing mechanism 58. Channels 67 provide a means of communication between slot 64 and the series of pockets 66. After passing around to the end of the network of pockets 66, bypass slot 68 is reached. Bypass slot 68 is positioned to align with a bypass hole 72 in piston 40 as shown in FIG. 1.

It is noted that piston 40 is provided with annular collecting groove 62 so that all of filter grooves 60 may be communicable with slot 64. It is further noted that mechanism 58 may be provided with ledge 57 to form a welding joint if, for example, ultrasonic welding is to be used to attach the device to the piston 40.

The timing mechanism, as well as the other rigid parts which make up the removable cartridge 10, may be made from a plastic material. In this regard it has been found that Noryl, a product of the General Electric Company, provides a suitable plastic material.

The flow of water from inlet 14 through timing mechanism 58 fills and pressurizes timing chamber 74. This results in the faucet's normally closed position shown in FIG. 1, and it is now ready for operation by the user.

In the case of a single inlet faucet rotation is prevented by key 199 on cartridge body 20 being held in keyway slot 201 cut into housing 12.

OPERATION

In operation, the user depresses push button 146 causing spring member 164 to force stem 112 and actuator 108 downward. Post 116 acts against relief valve poppet 82 causing seal 94 to move away from its seat on poppet support housing 76.

The prongs of latch spring 100 will expand outwardly as it follows poppet 82 on its downward travel. Spring 100 will expand to latch against angular shelf 103 to prevent an immediate return of poppet 82 to its seat. With poppet 82 in the open position, the small amount of water under pressure in timing chamber 74 is free to flow past ribs 84 in poppet 82, past actuator 108 or through actuator holes 160 and stem guide holes 161. The water flow continues around the outside of poppet support 76 and leaves the cartridge at a pair of slots 164 in cartridge body 20. The water then exits at housing oulet 16 through spout 11. With water from inlet 14 pressing upwards against the outer bottom surfaces of piston 40, and with timing chamber 74 now being vented, the timing piston 40 rises up from its valve seat 52. The inlet water passes seat 52, flows down slots 46 to the bottom of well 38 and out cartridge outlet 26 and casing outlet 16 to the faucet spout 11 for use by the user. Of particular importance is the restriction of flow through slots 46. This restriction maintains water pressure upstream of the restriction so that the pressure may continue to push upwards against the outer bottom surfaces of piston 40, thereby continuing the piston's upward travel off its seat. While piston 40 is in a position above its seat, water is supplied from inlet 14 to the user at spout 11.

When piston 40 has risen a sufficient distance, its annular rim 147 will bump latch spring 100, allowing spring 50 to return poppet 82 to its seat 94. With timing chamber 74 no longer vented through the poppet valve, its pressure increases to that of the supply line which communicates with chamber 74 through timing mechanism 58 and bypass hole 72. Piston 40 is pushed downward by the pressure in chamber 74. Since well 38 is vented, the force of water pressure acting upward on the bottom of the piston is not as great as the force acting in the downward direction, and piston 40 is caused to move downward toward seat 52. As piston 40 moves close to seat 52, a pressure drop suddenly occurs by the restricted flow of water in the area between seat 52 and well 38. This sudden pressure drop causes a quick addition to the closing force acting on piston 40 producing a sharp cutoff of water flow to the outlet.

A self-cleaning feature is provided by undercut 69 in cartridge body 20. As piston 40 returns to its seat, any foreign deposits on the piston or the body are pushed down into the undercut area 69. Thereafter, the deposits are free to be flushed through outlet 26, thereby preventing an excessive buildup of foreign matter which otherwise could effect the operation of the faucet.

As previously noted, the timing of the closing of main seat 52 is governed by timing mechanism 58. More specifically, it is the size and shape of pockets 66 and channels 67 which will determine the time of the operating cycle. A cycle of 8-10 seconds in duration is normally sufficient for the user to wash his hands. It is to be understood, however, that the invention should not be limited to any of the specific information given.

Of particular importance is the water conserving non-hold-open feature of the faucet which allows water to flow for only the predetermined period, regardless of the length of time th push botton is held down. As the tilted actuator 108 is forced downward by the depression of the push button, actuator 108 remains in the tilted position until its outer periphery contacts annular rim 157 on poppet support 76. When this occurs, actuator 108 is caused to be rotated to an axial or untilted position aligning post 116 with deep bore 90 at the end of the post's stroke.

To prevent excessive wear on poppet 82 by the repeated action of the tip of post 116, poppet 82 and poppet support 76 have been provided with serrated portions 86 and 80, respectively. The outer diameter of poppet 82 is such that when the poppet and support 76 are axially aligned, serrations 80 and 86 are spaced apart and not engaged. However, since post 116 moves along a nonaxial line on its downward stroke, the serrations will be cocked into engagement, thereby slightly rotating poppet 82 during its downward travel. Since poppet 82 is returned upward by the concentric forces of spring 50 and the water pressure in chamber 74, the serrations will not be engaged in the upward stroke and the poppet will not be caused to rotate back to its previous position. Each stroke of post 116, therefore, will rotate poppet 82 so that post 116 will act upon a different location of poppet 82 on successive strokes. This rotation enables poppet 82 to wear evenly further adding to the reliability of the faucet.

It is likely that some users will use a quick depression of the push button to activate the faucet. Under those circumstances relief valve poppet 82 would move only a short distance and quickly return to the closed position, causing the faucet to operate falsely. Precautions have been made in anticipation of any quick short depressions by the user. As previously described, latch spring 100 grips against the angular shelf 103. The latch spring 100 is positioned to grip even upon quick strokes of the push button. This latching effect will hold poppet 82 in the open position and allow timing chamber 74 to be fully vented. Operation for the full time cycle of 8 to 10 seconds will therefore result. It is noted that groove 102 should be made of sufficient depth to prevent latch spring 100 from moving to a position where it may catch on the bottom of support 76 and thereby cause the relief valve poppet to become stuck in the open position.

MIXING FAUCET

For application requiring a mixing faucet, the modification shown in FIGS. 2 and 2A may be employed. Casing 12 is provided with hot and cold water inlets 170, 172 and attached hot and cold water supply lines 174, 176, respectively. Check valves 197 are mounted in the hot and cold water supply lines to prevent the cross flow of water. Positioned within the bottom interior of casing 12 adjacent to inlets 170, 172 is mixing valve 180. Mixing valve 180 is attached to rim portion 30 of cartridge body 20, while seals 182 are positioned in grooves 184 to prevent leakage. Mixing valve 180 has a centrally located flow passage 186 opening to flow control 145 which is supported and sealed at ledge 188. Sleeve member 189 is positioned between mixing valve 180 and casing 12 and a pair of equally sized slots 191 diametrically disposed in sleeve 189 provide openings from inlets 170, 172 to the mixing valve.

It is noted that push button 146 is fastened to the top of cartridge body 20 by screws 148 and that mixing valve 180 is attached to the bottom of body 20. Therefore, the rotation of the mixing valve 180 may be conveniently made by rotational movement of the cartridge 20 by means of push button 146. During such rotation, balls 142 will act to reduce friction between cartridge body 20 and faucet casing 12. Rotation is limited to 180 degrees by means of key 199 on the upper edge of cartridge body 20 which, in this case, fits in a 180 degree keyway 200, shown in FIG. 2A, milled in the upper inside surface of faucet casing 12.

Figures 10, 11, 12, 13, 14, 15:
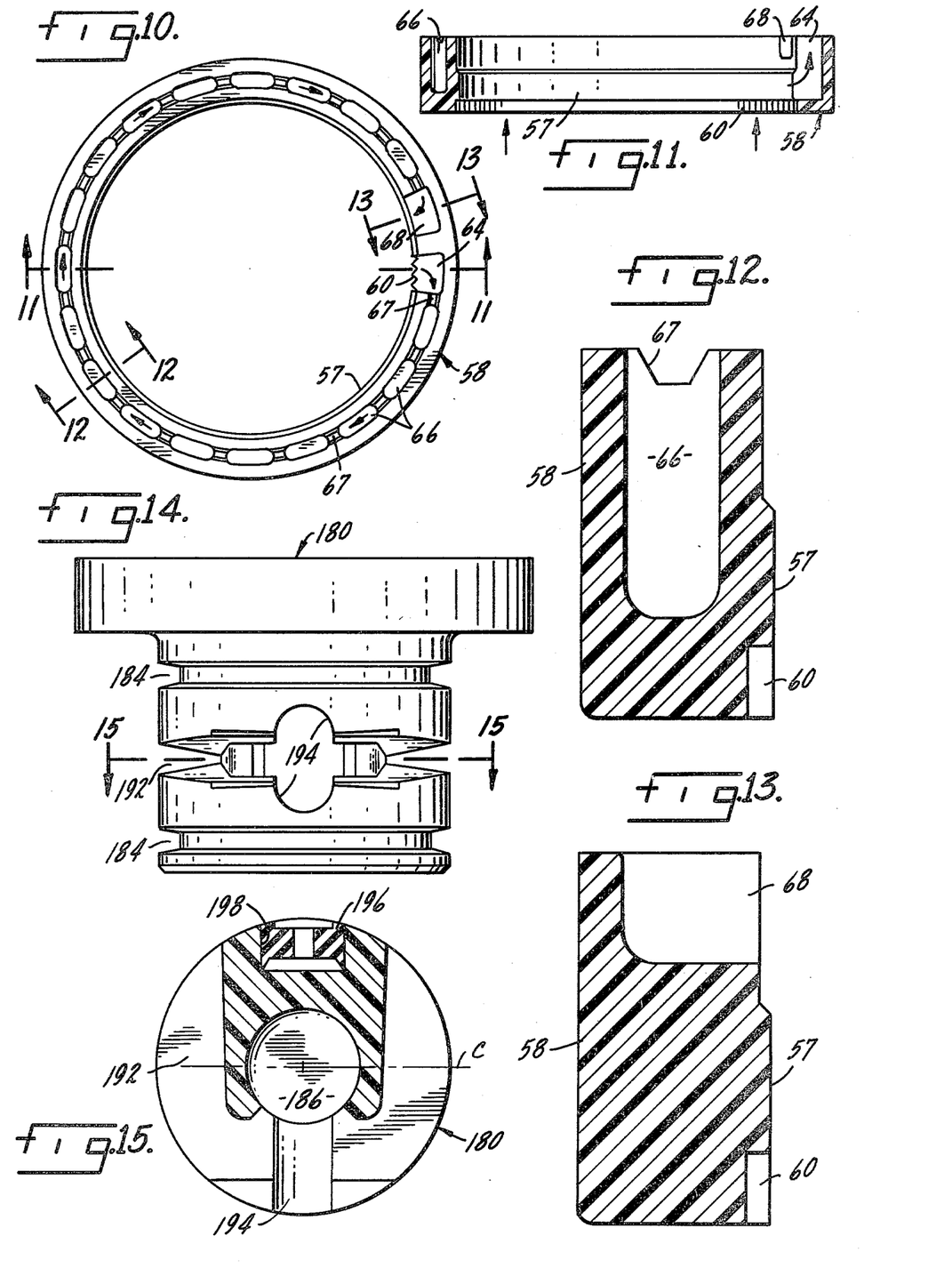
FIG. 10 is a top view of the timing mechanism.
FIG. 11 is a cross-sectional view of the timing mechanism taken on line 11—11 of FIG. 10.
FIG. 12 is a cross section on an enlarged scale of a typical timing mechanism pocket taken on line 12—12 of FIG. 10.
FIG. 13 is a cross section on an enlarged scale of the bypass slot of the timing mechanism taken on line 13—13 of FIG. 10.
FIG. 14 is a side view on an enlarged scale of the mixing valve portion.
FIG. 15 is a cross-sectional view of the mixing valve portion showing its mixing grooves and seal taken on line 15—15 of FIG. 14.

As seen in FIGS. 14 and 15, a symmetrical mixing groove 192 is provided in the outer surface of valve 180 and communicates with flow passage 186 through opening 194. Mixing groove 192 is widest at its center adjacent to opening 194 and narrows to a point at positions approximately 170 degrees from its center. With the valve 180 and groove 192 centrally positioned between hot and cold water inlets 170, 172, the position shown by center line C in FIG. 15, the flow area defined by groove 192 and slots 191 will be of equal size. To allow more hot water than cold water to pass through valve 180, the valve is rotated to the left. As the valve is rotated, the portion of groove 192 in communication with hot water inlet 170 will become wider, while, conversely, the portion of groove 192 in communication with cold water inlet 172 will become narrower. As the valve is rotated to the left a full 90 degrees from the central position, the hot water flow will be slowly increased until opening 194 will be in direct communication with the hot water inlet 170 providing a maximum flow of hot water. At the same time, the flow of cold water from inlet 172 will be increasingly restricted as it communicates with a narrowing portion of groove 192.

When valve 180 has been rotated a full 90 degrees to the left, port seal 196 in recess 198 will seat at inlet 172 thereby preventing cold water flow. By rotating the valve 90 degrees to the right from the maximum hot water position, an even mixing is again accomplished. A further rotation of 90 degrees results in maximum flow of cold water with the flow of hot water now prevented by seal 196.

It is noted that for some applications it may be desired to prevent the full flow of hot water which occurs when the valve is rotated a full 90 degrees to the left of the central position. To prevent the scalding possibility presented by extremly hot water, the keyway 200 may be milled so that only a 45° rotation, for example, is permitted to the left.

Thus it can be appreciated that the mixing of hot and cold water is complementary. For example, as the hot water flow is decreased, the cold water flow will increase a corresponding amount. The total amount of water flowing through mixing valve 180 will, therefore, remain substantially constant regardless of the water temperature selected by the user.

As described and illustrated, the invention comprises a faucet having a number of novel features all incorporated in a single unit which is adapted for use as a single cold water faucet or as a faucet for hot and cold mixed water.

The water conserving faucet has a self-closing and non-hold-open features which, after a predetermined period of time, automatically shut off flow regardless of a continued depression of the push button. The faucet is provided with an automatic flow regulator for regulating the water flow to a relatively constant value regardless of the variation in the inlet water pressures. The invention, therefore, provides both a constand period of water flow and constant volume of water for each use of the faucet. Finally, the faucet design may be easily modified to include a mixing valve for the mixing of hot and cold water for applications requiring a tempered mixture.

All of the foregoing features are combined into a single removable unit with the various elements constructed of the cartridge type so they can be readily replaced for servicing the same.

The cartridge 10 may be a replacement throwaway item so that after whatever period of time and use is required to clog, wear, or otherwise make the cartridge inoperative of or needing repair, the entire cartridge may be removed and replaced. This only requires that the push button 146 be removed by first taking off the top cap 154, removing the screws 148, and lifting off the push button. Then the retainer 144 is removed and the cartridge 10 in its entirety may be lifted out of the housing and replaced. The cartridge housing with the top closure 126 securely mounted in the upper end thereof, and either with or without the FIG. 2 mixing valve in the lower end thereof, is an intergral composite unit. When a new cartridge is inserted, the projecting pilot on the end of the lower cover 141, either with or without the mixing valve, will guide the insertion of the cartridge until the key 199 fits in its slot 200 or 201 and the retainer, screws, push button and cover reassembled. All of this can be done by unskilled labor which greatly reduces the expense, service, replacement, etc.

Whereas the preferred form of the invention has been shown and described herein, it should be realized that there may be many modifications, substitutions and alterations thereto.

The embodiments of the invention in which an exclusive property or privilege is claimed is defined as follows:

1. In a slow-closing faucet having a hot and a cold water inlet and a mixed outlet, a casing, a removable control cartridge in said casing, said cartridge controlling the passage of hot and cold water from said casing, an operating button on top of said casing connected to said cartridge, means in said cartridge responsive to the depression of said operating button for causing said cartridge to effect fluid flow from said hot and cold inlets to said outlet, means responsive to the rotation of said operating button for causing said cartridge to control the mixture of hot and cold water in accordance with the amount of rotation of said operating button, means in sid cartridge for causing the passage of water to be shut off in the event said operating button is held depressed unduly long, means in said cartridge for causing said mixing valve to slowly close after being opened to the passage of water, and means in said cartridge for causing a substantially constant rate of flow of mixed water from said outlet regardless of variations in water pressure from said hot and cold inlets.

2. The slow-closing faucet as claimed in claim 1 in which said means responsive to the rotation of said operating button for causing said cartridge to control the mixture of hot and cold water in accordance with the amount of rotation of said operating button including, a hollow mixing valve attached to the bottom of said cartridge and rotatable therewith, said mixing valve having a mixing groove in the outer surface of said mixing valve adjacent said inlets and in communication therewith, said mixing valve having an opening communicating said mixing groove with its interior, said mixing groove widest adjacent said opening and reducing in width as it extends therefrom.

3. The slow-closing faucet as claimed in claim 2 further characterized by said inlets being diametrically disposed in said casing, said mixing valve having a recess and seal position therein, said seal diametrically disposed in relation to said opening whereby when said opening is in direct communication with one of said inlets and said seal is opposite the other of said inlets.

4. A slow-closing faucet comprising a casing having an inlet and an outlet, a removable cartridge in said casing for controlling the flow of water between said inlet and said outlet, a piston in said cartridge, said cartridge having an annular groove and an annular valve seat positioned therein, said cartridge having a venting slot adjacent said groove, said venting slot communicating said groove with said outlet to prevent the buildup of water pressure in said groove behind said seat.

5. The slow-closing faucet as claimed in claim 4 further characterized by said cartridge having a well axially aligned and interior to said valve seat, said piston having a portion slidably mounted in said well, inner wall of said well adjacent said seat having a portion to engage said piston as it slides in said well and a portion of the wall having an undercut thereon adjacent said engaging portion, so that as said piston slides along said engaging portion towards said undercut portion, any foreign material on said engaging portion may be pushed into said undercut portion.

6. For use in a slow-closing faucet which has a casing with an inlet and an outlet and a manual push button on top, the improvement comprising a self-contained cartridge adapted to be removably positioned in the casing upon insertion therein when the push button is removed, the cartridge including a control mechanism for opening and closing a valve seat in the cartridge which, when the cartridge is positioned in the casing, is disposed between the inlet and the outlet, a cover secured to the top of the cartridge, an operating stem extending through the cover so that the upper portion thereon will be opposed to the push button and is in spaced slidable relationship thereto when the cartridge is assembled in the casing, and means in the cartridge associated with the operating stem to allow closing of the valve seat in the event the push button is continuously held in operative position.

7. The cartridge structure of claim 6 further characterized by and including a slidable piston in the cartridge having an annular valve seating portion thereon normally closed on the valve seat, the piston being hollow and having a bypass hole extending through the wall thereof, and timing and filtering means around the piston and covering the bypass hole.

8. The structure of claim 6 further characterized in that the timing and filtering means comprises a ring-shaped member having a series of vertical grooves around the inside bottom diameter surface, the ring-shaped member having a series of pockets formed around the inside diameter surface which are interconnected by channels.

9. The structure of claim 8 further characterized by and including a cup rubber seal on the piston engaging the side walls of the cartridge and providing a pressure chamber inside the piston.

10. In a faucet including a casing having an inlet connection and an outlet connection, a self-contained cartridge removably positioned and supported in the casing and having a valve mechanism therein, the cartridge being constructed, arranged and disposed in the casing so as to prevent flow between the inlet and outlet connections except through the valve mechanism of the cartridge, a control mechanism for opening and closing the valve mechanism so as to permit and control flow between the inlet and outlet connection, a cover on the top of the cartridge, a manul pushbutton on top of the casing and in slidable relationship to the casing, an operating stem extending through the cover between the control mechanism and the pushbutton so that upon actuation of the pushbutton the valve mechnism in the cartridge will be operated, a mounting for the pushbutton allowing it to be removed from the casing, and locking means for releasably holding the cartridge in the casing and positioned to be inaccessible when the pushbutton is in place on the casing, and means in the cartridge and association with the operating stem to allow closing of the valve mechanism in the event that the pushbutton is continuously in operative position.

11. In a slow closing faucet including a casing having inlet and outlet connections therein, a self-contained flow control cartridge removably positioned in the casing and having a valve mechanism therein, the cartridge being constructed and disposed in the casing so as to prevent flow between the inlet and outlet connections except through the valve mechanism, the valve mechanism including a fixed seat and a movable piston biased to normally close on the seat, a pressure chamber behind the piston, a manually operable pushbutton on the casing controlling the pressure chamber and constructed, upon actuation thereof, to relieve the pressure in the pressure chamber and to thereby allow the piston to separate from the seat thereby opening the valve mechanism and allowing flow between the inlet and outlet connections, a limited bypass providing communication between the inlet connection and the pressure chamber, and a timing and filtering ring on the piston controlling the bypass and having a series of vertical grooves around the inside thereof with a series of pockets interconnected by channels around the ring in communication with the grooves.

12. The slow closing faucet as claimed in claim 11 in which the series of pockets are formed around the top surface of the ring and in spaced relationship to each other, the channels providing communication between the pockets, one of the channels connecting one of the pockets to the bypass.

13. The slow closing faucet as claimed in claim 12 in which the piston has an annular collecting groove on the outer surface thereof adjacent the filter groove, the annular groove providing communication between the filter grooves and the slot.

14. In a slow closing faucet comprising a tubular casing having a bottom inlet and an outlet, a flow control cartridge removably inserted in the casing for controlling the inlet and outlet flow of fluid through the faucet, sealing means between the bottom inlet of the cartridge and the casing, a flow regulating device in the inlet adjacent the sealing means, sealing means between the casing and the cartridge, locking means between the cartridge and casing, a pushbutton on top of the casing effective to control the cartridge to cause fluid flow through the faucet from the bottom inlet to the outlet, and means for disconnecting the pushbutton from the cartridge to enable removal of the cartridge from the casing, both of the sealing means being provided on the cartridge and being withdrawn from inside the casing with the cartridge, the locking means between the cartridge and casing comprising a series of balls held in place in the walls of the casing by a resilient cup-shaped retaining member, the cartridge having a body and a top cover and a bottom cover attached thereto, the pushbutton having a stem extending through the top cover into operative relationship to the cartridge, and sealing means around the pushbutton and secured to the bottom of the top cover.

15. In a slow closing faucet, a casing having an inlet and an outlet passage therein, a removable control cartridge in the casing for controlling the opening and closing of the passage, said cartridge having a pressure chamber and a piston therein, a valve seat for the piston for controlling flow, means for normally causing the piston to engage the seat to close the passage when the pressure chamber is pressurized, means for causing the piston to move off of the seat when the pressure chamber is vented thereby opening the passage for fluid flow, means for venting the pressure chamber including a poppet support adjacent the chamber, said poppet support being attached to the cartridge and having an opening communicating the chamber with the outlet, a poppet valve reciprocally mounted in the opening, means for normally seating the poppet valve against the opening to close the opening, a pushbutton reciprocally mounted on the casing so that the pushbutton may be manually depressed to operate the faucet, means to transmit a depression of the pushbutton to reciprocal movement of the poppet valve to open the opening to allow venting of the chamber, and means in the cartridge to temporarily hold the poppet valve in open position to cause the chamber to be fully vented upon quick depression of the pushbutton, said last mentioned means including the support having an annular groove around the opening, and an angular shelf adjacent the groove, a spring member attached to the poppet valve and movable therewith, said spring member extending into the groove when the poppet is in the closed position and latching against the shelf when the poppet valve is moved to open position to hold the poppet in the open position, and means to move the spring from the shelf to return to the groove after a predetermined time.

* * * * *